United States Patent [19]
Waldron

[11] Patent Number: 5,718,106
[45] Date of Patent: Feb. 17, 1998

[54] CANOPY FORMING GROVE TREE TRIMMER

[75] Inventor: Curtis R. Waldron, Okeechobee, Fla.

[73] Assignee: Cross Hedging Inc., Okeechobee, Fla.

[21] Appl. No.: 654,173

[22] Filed: May 28, 1996

[51] Int. Cl.$^6$ .................................................. A01D 55/18
[52] U.S. Cl. .................................................. 56/235; 56/119
[58] Field of Search ........................... 56/233, 234, 235, 56/237, 11.9, 13.5, 13.6, 6, 15.2

[56] References Cited

U.S. PATENT DOCUMENTS

| | | | |
|---|---|---|---|
| 3,487,615 | 1/1970 | Leydig et al. | 56/235 |
| 3,952,485 | 4/1976 | McRobert | 56/235 |
| 4,067,178 | 1/1978 | Miller | 56/235 |
| 4,627,227 | 12/1986 | Dixon | 56/235 |
| 5,210,997 | 5/1993 | Mountcastle, Jr. | 56/235 X |
| 5,291,723 | 3/1994 | Lindsey | 56/235 |
| 5,430,999 | 7/1995 | Grant | 56/235 X |

Primary Examiner—Terry Lee Melius
Assistant Examiner—Robert Pezzuto
Attorney, Agent, or Firm—Carroll F. Palmer

[57] ABSTRACT

A tree trimming machine capable of moving between rows of grove trees to remove interior growth from the trees while leaving a canopy of tree boughs over the trimmed area includes a wheeled platform supporting right and left saw units positioned at the front, each having upper and lower circular saw blades rotatably carried by bearing members so the planes of all saw blades are parallel and held laterally beyond the sides of the platform. Slideways are fixed on both right and left sides of the platform, at an angle relative its mounting surface, along which the saw blade bearing members move between upper and lower limits to simultaneously raise and lower the saw blades that are hydraulically driven by a pump powered by an internal combustion motor mounted at the rear, which also drives the vehicle wheels.

5 Claims, 4 Drawing Sheets

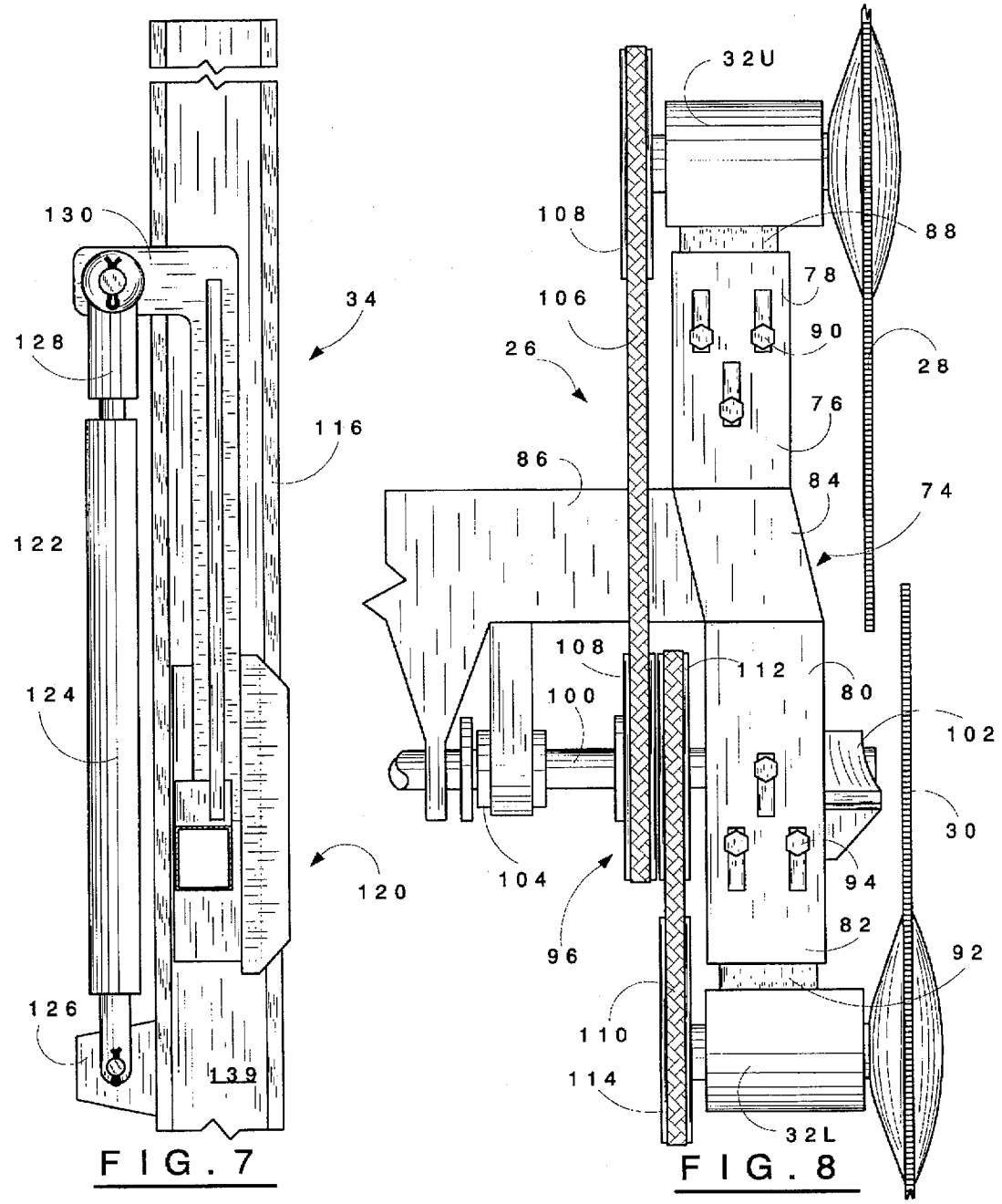

CANOPY FORMING GROVE TREE TRIMMER

BACKGROUND OF THE INVENTION

1. Field of the Invention

This application relates to tree trimming equipment. More particularly, it concerns a motor driven, wheeled machine for trimming grove fruit trees, e.g., citrus trees, to form worker passageways therein covered with a canopy of tree boughs.

2. Description of the Prior Art

Commercial plantings of fruit trees are typically made in a uniform pattern of parallel rows for reasons of economy in maintaining and harvesting the trees. Such plantings are called by several different names depending upon the type of fruit the trees bear. For example, plantings of citrus trees are called groves while apple tree plantings are called orchards. Since citrus trees are not freeze resistant, they are grown in tropic or semi-tropic areas with the result they grow rapidly and require frequent trimming to maintain a grove in satisfactory operating condition. Hence, this invention especially relates to citrus tree groves, but is relevant to orchards or other types of commercial fruit tree plantings.

The spacing of trees in commercial pattern plantings varies depending on the fruit type, the harvesting practice of a growth region, etc. In the case of citrus groves the spacing may be from more than 12 feet on centers to as low as 6 feet in the case of so-called double density grove plantings. The new trimming devices of this invention are designed to operate with trees of any spacings found in commercial pattern plantings.

Periodically workers must move about grove trees to pick fruit and then move to transport vehicles that access the groves on trails that run at spaced intervals parallel to the tree rows. With the rapid growth of citrus grove trees, it takes only a few years until the trees expand so that the spaces between them inhibit or even prevent workers to access the transport vehicles. This requires grove owners to seek ways of opening up space between trees for pickers to move. One method has been to use chain saws to cut away tree branchs to open up required space. However, this is an expensive operation and because it generally results in creating a clear opening from ground to the sky, the sun shines on the sides of the trees with the result that the trees grow rapidly at their sides and quickly fill in the cleared space thereby restoring the worker access problem.

Another attempted solution has been to remove some trees to provide worker access space. Unfortunately where this has been tried, about five years with the sun shining on the sides of the trees, it is hard to tell where the trees were removed, the required space has filled in by new side growth and the grove owner has lost the production of the removed trees, but still has the access problem.

The present invention provides a solution to the worker access problem without need for removal of grove trees and also mitigates fill in of cleared access space by side growth of trees because the new trimming machines of the invention leave a bough canopy over the cleared access space which substantially stops the side growth of the grove trees in the cleared access space.

It is well known to use wheeled, motor driven machinery to trim trees in pattern plantings, along roadways or the like as shown by U.S. Pat. Nos. including: 3,200,574 4,067,178 3,487,615 4,627,227 3,925,485 5,430,999.

The present invention provides a new specialized form of wheeled, motor driven, tree trimming machine for accomplishing a task which can not be effectively performed by the machines of the above listed patents or other prior know tree trimming machinery.

OBJECTS

A principal object of the invention is the provision of a new form of tree trimming machinery.

A further object is the provision of a tree trimming machine for trimming fruit trees existing in groves or similar pattern plantings to create worker pathways between trees while leaving a canopy of tree boughs over the trimmed pathways to mitigate tree side growth within the trimmed area.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in accordance with the invention by the provision of a grove tree trimming machine capable of moving between rows of trees to remove interior growth from the trees while leaving a canopy of tree boughs over the trimmed area.

The new machine is a mobile vehicle defined by a longitudinal axis, a front section, a rear section and has a chassis carried on wheels that includes a platform having a flat mounting surface, a front end, a rear end, a right side and a left side, Right saw means that is positioned on the front section comprises a right upper circular saw blade and a right lower circular saw blade, both rotatably carried by bearing means so the planes of both blades are parallel to the longitudinal axis of the vehicle and extend laterally beyond the right side of the platform.

Support means for such right saw means comprises a slideway mounted on the platform and angled relative to the flat mounting surface along which the right bearing means moves between a right upper limit and a right lower limit to simultaneously raise and lower both right saw blades.

Left saw means positioned on the front section of the machine also includes left support means comprising a slideway and in all other respects mimics the right saw means.

Hydraulic fluid powers rotation of the right and left saw blades and moves the right and left bearing means up and down on the respective slideways to raise and lower the saw blades.

An internal combustion motor in the rear section operates a hydraulic pump for the hydraulic fluid system and drives the wheels and power assisted steering means. Such steering means can be of the wheel type or the lever type.

BRIEF DESCRIPTION OF THE DRAWINGS

A more complete understanding of the invention can be obtained by reference to the accompanying drawings in which generic portions of the illustrated matter are indicated by arrowhead lines associated with the designation numerals while specific parts are indicated with plain lines associated with the numerals and wherein:

FIG. 7 is a fragmented lateral sectional view of one of the saw blade support slideways of the trimming machine of FIG. 1.

FIG. 8 is a fragmented front view of the saw means of the new trimming machine.

DESCRIPTION OF THE PREFERRED EMBODIMENTS

Figure 1:
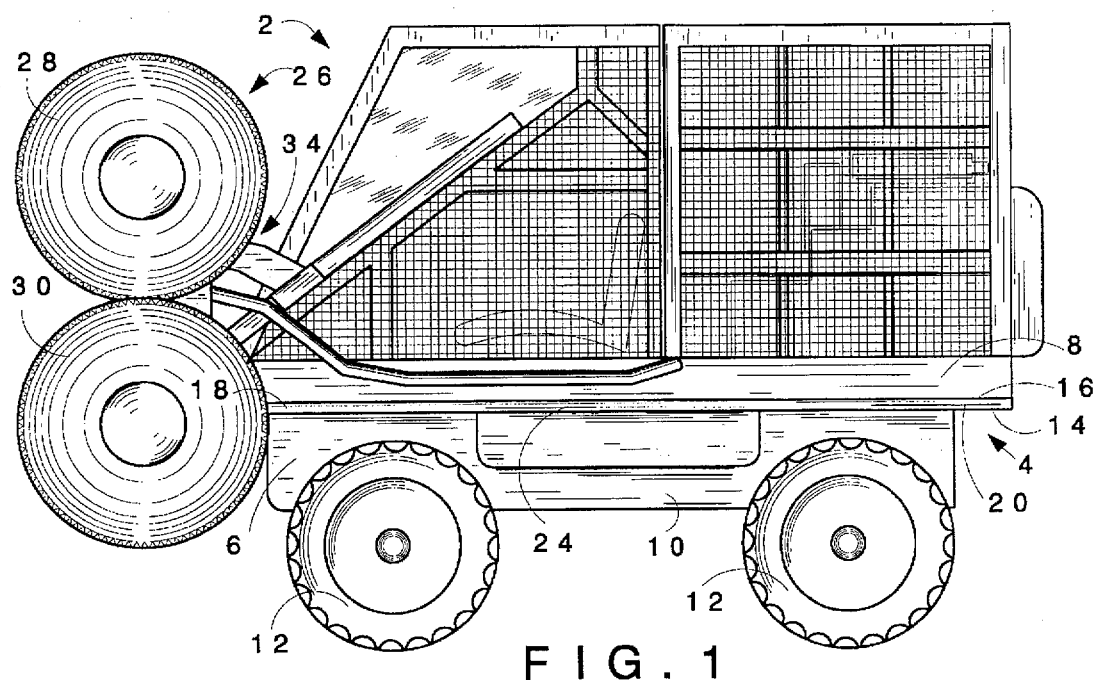
FIG. 1 is a lateral view of a grove tree trimming machine constructed in accordance with the invention.
Figure 2:
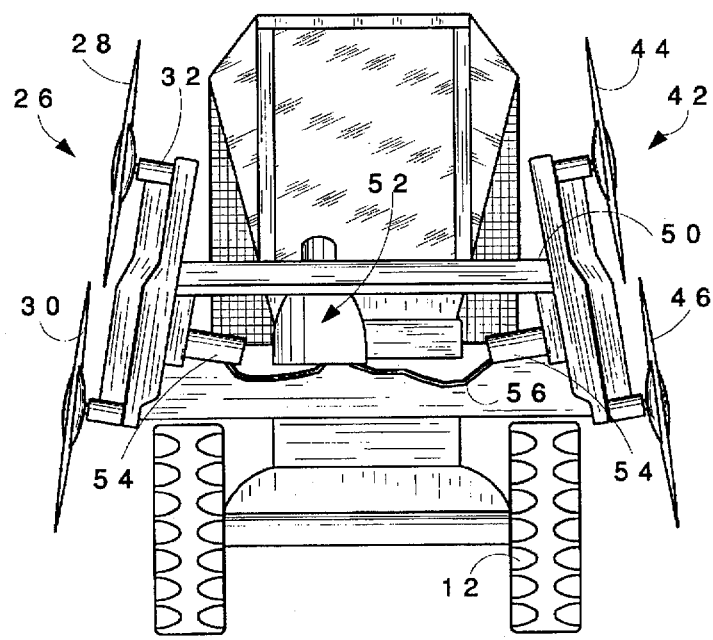
FIG. 2 is a front view of the machine shown in FIG. 1.
Figure 3:
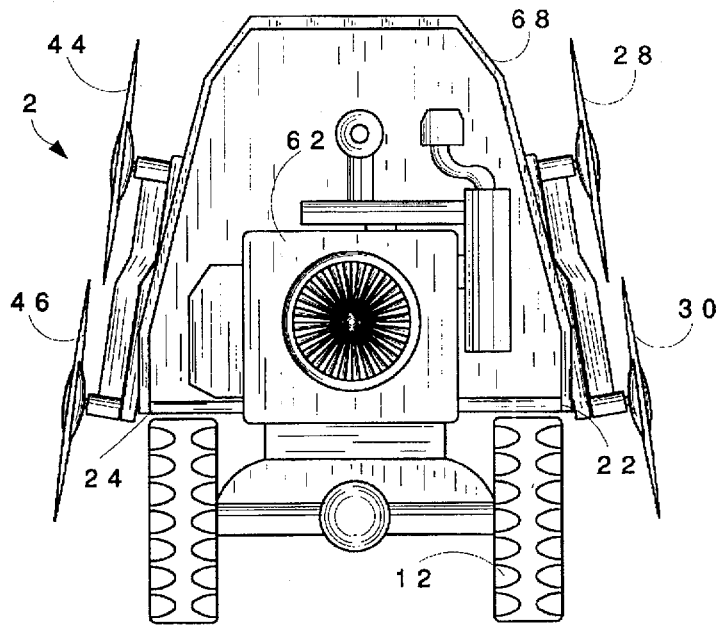
FIG. 3 is a rear view of the machine shown in FIG. 1.
Figure 4:
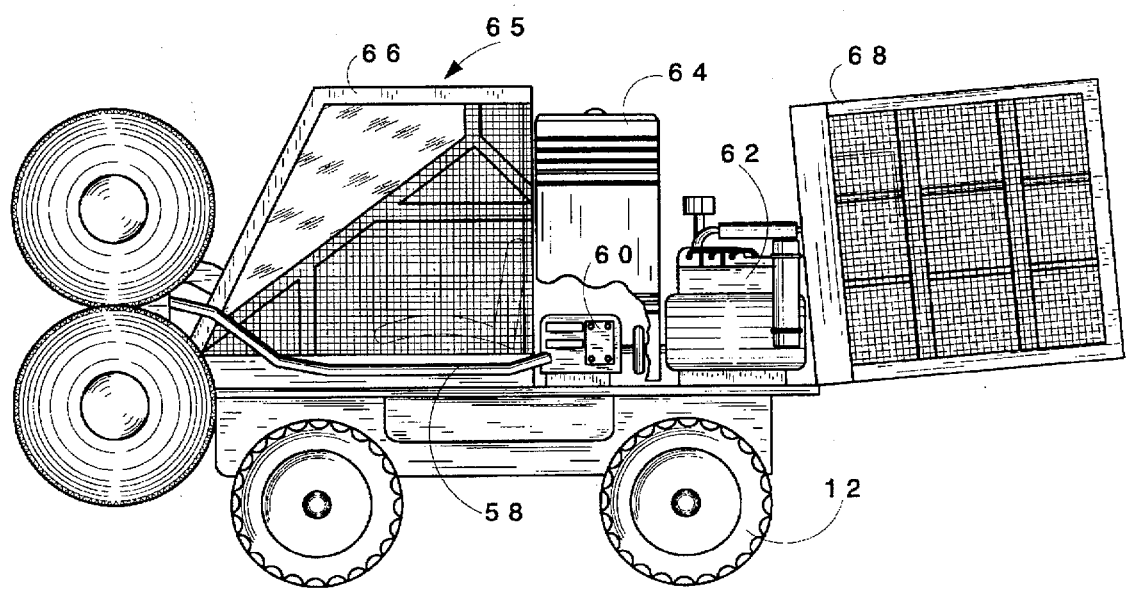
FIG. 4 is a lateral view similar to FIG. 1, but with the rear enclosure unit in its opened position.

The grove tree trimming machine 2 of the invention comprises a mobile vehicle 4 defined by a longitudinal axis, a front section 6, a rear section 8. A chassis 10 carried on wheels 12 and includes a platform 14, a flat mounting surface 16, a front end 18, a rear end 20, a right side 22 and a left side 24.

Left saw means 26 positioned on the front section 6 comprises a left upper circular saw blade 28 and a left lower circular saw blade 30, both rotatably carried by left bearing means 32 so the planes of both the left saw blades are parallel to the longitudinal axis of the vehicle 4 and extend laterally beyond the left side 24 of the platform 14.

Left support means 34 comprises a slideway 36 mounted on the platform which is angled relative to the flat mounting surface 16. The left bearing means 34 moves between a left upper limit 38 and a left lower limit 40 to simultaneously raise and lower the left saw blades 28/30.

Right saw means 42 positioned on the front section 6 comprises a right upper circular saw blade 44 and a right lower circular saw blade 46 both rotatably carried by right bearing means 48 so the planes of both the saw blades are parallel to the longitudinal axis and extend laterally beyond the right side 22 of the platform 14.

The right support means 50 for the right saw means 42 is not shown in detail since it is essentially the mirror image of left support means 34 and comprises a similar slideway mounted on the platform and angled relative to the flat mounting surface along which the right bearing means 48 moves between a right upper limit and a right lower limit to simultaneously raise and lower the right saw blades 44/46.

In preferred embodiments of the invention, all the saw blades are of equal diameter, the distance between the right upper limit and the right lower limit is equal to the distance between the left upper limit and the right lower limit, and such equal distance is not greater than about the length of the equal diameter of the saw blades. These limitations on dimensions of the machine components insure that the trimming machine 2 when operated will leave a canopy of tree growth above the area trimmed out between the machine as it passes between rows of trees.

Hydraulic power means 52 to rotate the right and left saw blades and move the right and left bearing means includes hydraulic motors 54, hoses 56, conduits 58 and a hydraulic pump 60.

An internal combustion motor 62 in the rear section 8 of the vehicle 4 operates the hydraulic pump 60 and drives the wheels 12 and power steering.

The machine 2 also includes fuel and hydraulic fluid tanks 64; a protective enclosure 65 having a fixed front section 66 and a hinged rear section 68; operator seat 70; steering means 72 and other controls (not shown).

The steering means 72 may be of the wheeled type as shown or of the lever type (not shown).

The left saw means 26 and right saw means 42 are essentially mirror images of each other. Hence, with reference to FIG. 8, description of them is based on the left saw means 26.

The saw means 26 comprises a vertical tubular member 74 having an upper portion 76 with a polygonal cross-sectional top entrance 78, a lower portion 80 with polygonal cross-sectional bottom entrance 82 and a central portion 84 integrally joining the left upper portion 76 to the left lower portion 80.

A mounting arm 86 extends laterally from the vertical tubular member 74.

An upper tubular support 88 for the upper bearing 32U telescopes into the top entrance 78 and its position relative to upper portion 76 may be adjusted by bolts 90. Hence, the upper circular saw blade 28 is rotatably supported by the tubular member 74.

A lower tubular support 92 adjustably telescopes into the bottom entrance 82 of lower portion 80 and is fixed at the desired tension position by bolts 94.

The lower bearing 32L fixed on the tubular support 92 rotatably carries the lower circular saw blade 30.

The saw means further comprises drive means 96 for operation of the saw blades 28/30 that includes a shaft 100 that is connected at one end (not shown) to a hydraulic motor 54 and runs in end bearing 102 and inner bearing 104.

An upper belt 106 which drives the upper saw blade 28 runs over pulley 108 fixed to shaft 100 and pulley 108 connected to the saw blade 28.

A lower belt 110 which drives the lower saw blade 30 runs over pulley 112 fixed to shaft 100 and pulley 114 connected to the saw blade 30.

The left support means 34 and right support means 50 are essentially mirror images of each other. Hence, with reference to FIGS. 5, 6 & 7, description of them is based on the left support means 34.

The support means 34 comprises a slideway 36 formed by a rail 116 fixed in part to the platform 14 by vertical tube 118 at an acute angle relative to the platform 14.

A slide unit 120 is carried on the rail 116 to be moved between upper limit 38 and lower limit 40 by adjustment means 122.

Adjustment means 122 includes a cylinder 124 connected to lug 126 carried on rail 116 and piston 128 connected to crank 130 which, in turn, is joined to slide unit 120. Hence, operation of the hydraulic cylinder 124 via controls (not shown) in front of seat 70 moves the slide unit 120 up and down the slideway 36.

The slide unit 120 comprises an outer channel section 132 and inner tubular member 134 both welded to a multipart brace assembly 136 and includes plastic strips 138, 139 & 140 to reduce friction.

Figure 5:
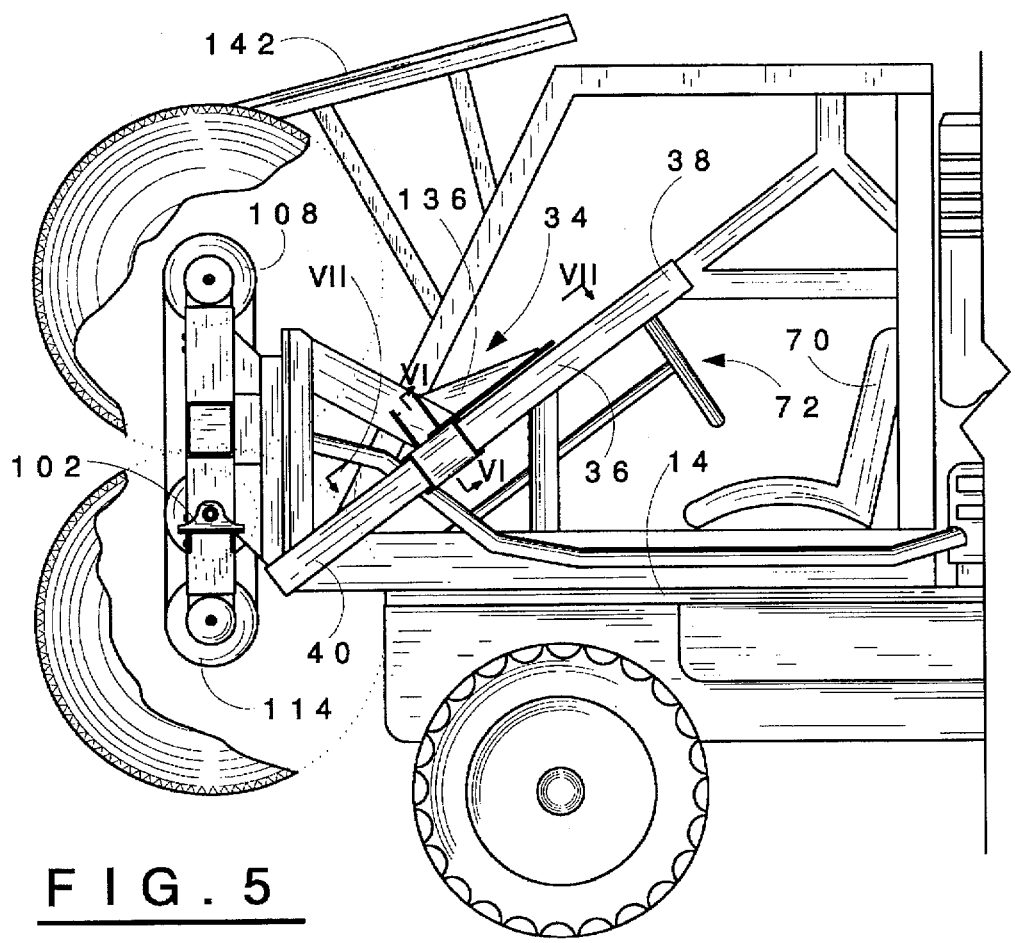
FIG. 5 is a fragmentary lateral view of the front portion of the machine with the saw blades broken partly away to show interior machine details.
Figure 6:
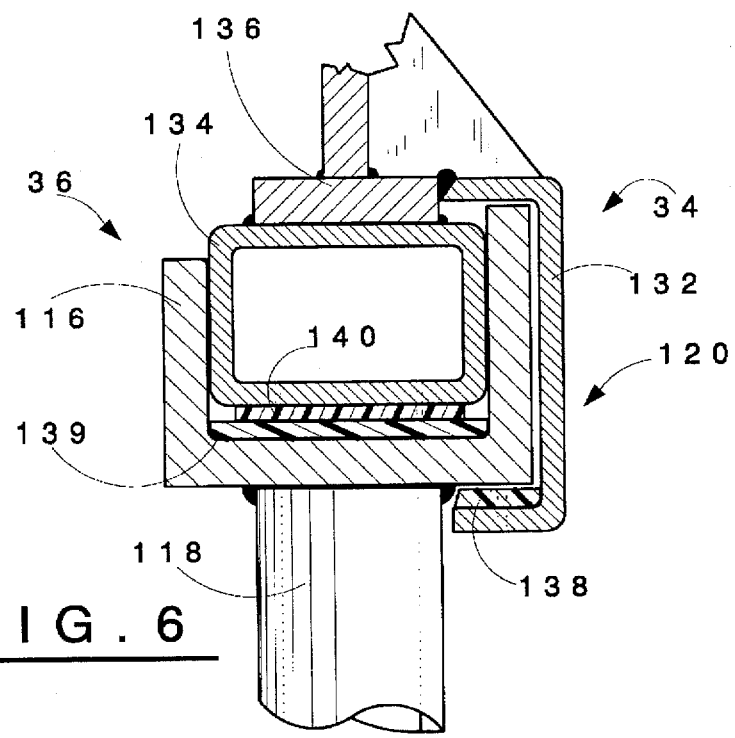
FIG. 6 is a fragmentary enlarged sectional view taken on the line VI—VI of FIG. 5.

As shown in FIG. 5, the machine 2 may be equipped with a shelter 142 to protect the front end of the machine as it moves along through the tree rows.

I claim:

1. A motorized device capable of moving between rows of grove fruit trees to remove interior growth from the trees while leaving a canopy of tree boughs over the trimmed area comprising:

a mobile vehicle defined by a longitudinal axis, a front section, a rear section and having a chassis carried on wheels that includes a platform defined by a flat mounting surface, a front end, a rear end, a right side and a left side, right saw means positioned on said front section consisting of a right upper circular saw blade and a right lower circular saw blade both rotatably carried by right bearing means so both said right saw blades lie in a plane parallel to said longitudinal axis and extend laterally beyond said right side of said platform, right support means comprising a slideway mounted on said platform and angled relative to said flat mounting surface along which said right bearing means moves between a right upper limit and a right lower limit to simultaneously raise and lower said right saw blades, left saw means positioned on said front section consisting of a left upper circular saw blade and a left lower circular saw blade both rotatably carried by left bearing means so both said left saw blades left in a plane parallel to said longitudinal axis and extend laterally beyond said left side of said platform, left support means comprising a slideway mounted on said platform and angled relative to said flat mounting surface along which said left bearing means moves between a left upper limit and a left lower limit to simultaneously raise and lower said left saw blades, hydraulic power means to rotate said right and left saw blades and move said right and left bearing means, and an internal combustion motor in said rear section to operate said hydraulic power means and drive said wheels.

2. A motorized device of claim 1 wherein:

all said saw blades are of equal diameter, the distance between said right upper limit and said right lower limit is equal to the distance between said left upper limit and said right lower limit, and said equal distance is not greater than about the length of said equal diameter.

3. A motorized device of claim 1 wherein said left saw means comprises:

a vertical tubular member including a upper portion with polygonal cross-sectional top entrance, a lower portion with polygonal cross-sectional bottom entrance and a central portion integrally joining said upper portion to said lower portion, a mounting arm extending laterally from said vertical tubular member, a upper tubular support having an upper mount end and a lower end adjustably telescoped into said top entrance, said upper circular saw blade being rotatably supported on said upper mount end, a lower tubular support having a lower mount end and a upper end adjustably telescoped into said bottom entrance, said lower circular saw blade being rotatably supported on said lower mount end, a upper belt which drives said upper circular saw, and a lower belt which drives said lower circular saw, and said right saw means mimics said left saw means.

4. A motorized device of claim 3 wherein said left support means comprises:

a rail fixed to said platform at an acute angle relative to said platform, a slide moveably carried on said rail, adjustment means to move said slide along said rail, said slide being fixed to said mounting arm of said left saw means thereby supporting said right vertical tubular member.

5. A motorized device of claim 1 which additionally includes a hydraulic pump unit carried on said platform in said rear section which is powered by said internal combustion motor, and conduit means operationally connecting said hydraulic pump unit with said hydraulic power means.

* * * * *